United States Patent [19]

Whitelaw

[11] 4,435,022
[45] Mar. 6, 1984

[54] TRACK BLOCK

[76] Inventor: Brett A. Whitelaw, 2575 NE. Kathryn, Unit 28, Hillsboro, Oreg. 97123

[21] Appl. No.: 342,082

[22] Filed: Jan. 25, 1982

[51] Int. Cl.³ .......................................... B62D 55/20
[52] U.S. Cl. ................................. 305/53; 305/58 R; 474/219
[58] Field of Search ........................ 474/219, 232, 234; 305/34, 39, 50, 53, 54, 58 R

[56] References Cited

U.S. PATENT DOCUMENTS

| | | | |
|---|---|---|---|
| 1,305,593 | 6/1919 | Franco | 305/53 X |
| 1,413,099 | 4/1922 | Cox | 305/53 X |
| 1,513,459 | 10/1924 | Jett | 305/58 X |
| 1,789,814 | 1/1931 | George | 305/56 |
| 1,835,627 | 12/1931 | Bauer | 305/57 |
| 2,389,438 | 11/1945 | Knox | 305/56 X |
| 2,481,727 | 9/1949 | Deffenbaugh | 305/53 X |
| 3,721,476 | 3/1973 | Andersson | 305/58 X |
| 4,139,240 | 2/1979 | Profio et al. | 305/39 |

FOREIGN PATENT DOCUMENTS

| | | | |
|---|---|---|---|
| 1085433 | 7/1960 | Fed. Rep. of Germany | 305/39 |
| 896716 | 3/1945 | France | 305/39 |

*Primary Examiner*—David A. Scherbel
*Attorney, Agent, or Firm*—Kolisch, Hartwell & Dickinson

[57] ABSTRACT

A track block for a track-laying vehicle. The block is characterized by an elongated unitary beam, with two diverging links extending radially in a common direction from opposite ends of the beam. The links are constructed to straddle, and to be hinged to, the beam in an adjacent block. Cantilevered from a central portion of the beam, and extending generally in the same direction as and coplanar with the links, is a road-wheel bearing plate, through which received road-wheel bearing forces are carried directly to the links solely through the beam.

2 Claims, 6 Drawing Figures

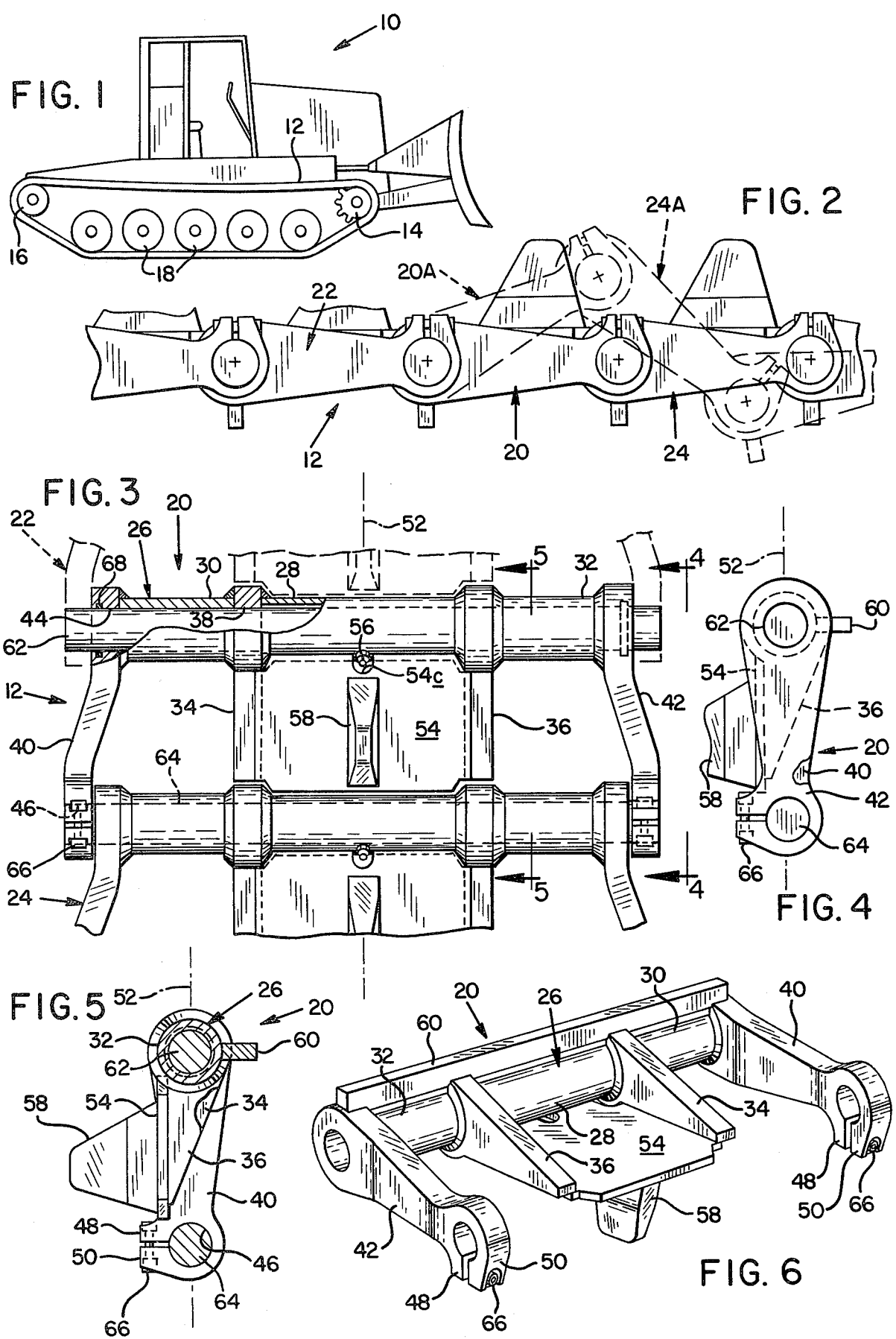

TRACK BLOCK

BACKGROUND AND SUMMARY OF THE INVENTION

The present invention relates to track-laying vehicles, and more particularly, to a unique track block which is hingeable to other like blocks to form a continuous track strand for use in such a vehicle.

As is well known by those skilled in the art, track-laying vehicles are among those which are subjected to the severest kinds of environmental and operational punishment. Among the more highly abused structures in such a vehicle are the track stands which provide for ground-traveling support. In many vehicles of the type generally outlined, such strands are required to encounter successfully a huge variety of terrains which require that the blocks which make up the strands be capable of carrying extremely large ground-bearing forces, and be capable of exhibiting a high degree of articulation with respect to one another in order to negotiate unevenesses in terrain.

As is also well known in the art, a large variety of track block constructions has been proposed in the past to meet these and other objectives.

A primary object of the present invention is to provide a unique track block construction which is relatively simple in construction, and which is capable of furnishing outstanding performance under circumstances like those just mentioned above.

While experience may show other convenient and economic ways of making the track block of the invention, the same is disclosed herein in the form of what will be referred to as a "fabricated" structure, wherein initially separated parts are joined through welding to form the final block structure.

According to a preferred embodiment of the invention, a generally planar track block is proposed which is characterized by a single elongated unitary beam, with two diverging links extending radially, and in a common direction, from opposite ends of the beam. The links are constructed to straddle, and to be hinged to, the beam in an adjacent block, thus, and in a repefashion, to form an endless track strand. Cantilevered from a central portion of the beam, and extending generally in the same direction as and coplanar with the links, is a road-wheel bearing plate. The outer end of this plate is unsupported by any other structure, and more specifically, has no connection with the next adjacent block in a strand. This plate functions to transmit all received road-wheel bearing forces directly to the associated links in the block solely through the associated beam.

Various other objects and advantages which are attained by the invention will become more fully apparent as the description which now follows is read in conjunction with the accompaying drawings.

DESCRIPTION OF THE DRAWINGS

FIG. 1 is a simplified side elevation of a track-laying vehicle employing a pair of track laying strands each of which is made up of blocks constructed in accordance with the present invention.

FIG. 2 is an enlarged fragmentary side elevation of a small length of the lower run in the track strand shown in FIG. 1, with hinged-together blocks in this run shown in one set of relative positions in solid outline, and in another set of relative positions (at least for several of the blocks) in dashed outline.

FIG. 3 is what might be thought of as a road-wheel-side plan view of several hinged-together track blocks made in accordance with the present invention, illustrated as if one were looking at the top-side of FIG. 2 with the view rotated 90° clockwise.

FIG. 4 is a fragmentary and somewhat simplified view taken along line 4—4 in FIG. 3.

FIG. 5 is a cross-sectional view taken generally along line 5—5 in FIG. 3.

FIG. 6 is a perspective view of a single track block made in accordance with the present invention, taken generally from the ground-contacting side of the block.

DETAILED DESCRIPTION OF THE INVENTION

Turning now to the drawings, and referring first of all to FIG. 1, here there is shown generally at 10 a track-laying vehicle which employs a pair of endless track strands, such as the one shown at 12, made-up of track blocks constructed in accordance with the present invention. Each strand is trained over a power drive sprocket, such as sprocket 14, an idler, such as idler 16, and vertically articulatible road-wheels such as the two shown at 18. The sprockets, idlers and road-wheels are completely conventional in construction, and are carried in the usual manner on the frame in vehicle 10. While it is not important to understand the exact nature of vehicle 10, the same, as disclosed herein, is one which is used in the woods for various logging purposes. It is in the setting of such a vehicle that the track block of the invention offers special utility.

Turning attention to FIGS. 3-6, inclusive, a generally planar track block constructed in accordance with the invention is shown generally at 20. In FIG. 3, block 20 is shown connected to two other blocks 22, 24, which, together with block 20, makeup a fragmentary part of previously mentioned strand 12. In FIGS. 4 and 5, elements of blocks 22, 24 are omitted in order to focus on the construction of block 20. In FIG. 6, block 20 is shown in a removed and isolated state.

What might be thought of as the backbone of block 20 takes the form of an elongated beam 26, also referred to herein as a straddled-connection portion. In general terms, beam 26 is formed with a tubular construction, and includes a central tube 28 and a pair of end tubes 30, 32. As can be seen in FIG. 3, tubes 28, 30, 32 have the same outside diameters. As can also be seen particularly in the same figure, and for a reason which will be explained shortly, tube 28 has a slightly larger inside diameter than those of tubes 30, 32—the latter two diameters being substantially the same.

The left end of tube 28 in FIG. 3 is joined to the right end of tube 30, as by welding, through the upper end portion of a cantilever arm 34. Similarly, the right end of tube 28 in FIG. 3 is joined to the left end of tube 32 in the figure through the upper end of another cantilever arm 36. Arms 34, 36 have the side profiles clearly shown in FIGS. 4 and 5, and where these arms join with the respective tubes, the arms include bores, such as bore 38 in arm 34, which align axially with the bores in the various tubes.

Welded to the outer ends of tubes 30, 32, are two angled links 40, 42, which are also referred to herein as straddling-connection link portions. The side profiles of links 40, 42 are clearly shown in FIGS. 4 and 5. The upper ends of links 40, 42 in FIGS. 3, 4 and 5 have bores, such as bore 44 in link 40, which are aligned with the central bores in tubes 30, 32. The lower ends of the links in the figures include bores, such as bore 46 in link 40, which have substantially the same diameters as previously mentioned bore 44. As can be seen in FIGS. 4, 5 and 6, the lower ends of the links have bifurcated lateral projections forming opposed clamping ears, such as the ears shown at 48, 50 in link 40 (FIGS. 5 and 6).

Arms 34, 36 and links 40, 42 extend generally in a common direction from beam 26—with this direction generally paralleling what is referred to herein as the travel axis of block 20. Such axis is shown by dash-dot line 52.

Joined as by welding to the outside of tube 28, and to the surfaces of arms 34, 36 which face the viewer in FIG. 3, is a plate 54 which, together with arms 34, 36, is referred to herein as a road-wheel bearing means. The peripheral outline of plate 54 is shown clearly in FIG. 3, and can be seen to include, along its upper edge in FIG. 3, a notch 54c which affords clearance for a conventional grease fitting 56 which is mounted centrally on the wall in tube 28. Welded to the face of plate 54 which confronts the viewer in FIG. 3 is a somewhat pyramidal projection 58 which functions herein as a lateral road-wheel guide. The side profile of guide 58 is best illustrated in FIG. 5.

Completing a description of the construction of block 20, the same includes an elongated rib or grouser 60 which is joined to the far side of beam 26 in FIG. 3 (the right side thereof in FIGS. 4 and 5), and which projects laterally therefrom as shown.

In FIG. 3, the side of block 20 which faces the viewer is what will be referred to herein as the inner or road-wheel-contacting side of the block. In FIGS. 4 and 5, the inner side of the block faces to the left, and in FIG. 6, faces downwardly. The far side of block 20 in FIG. 3 (the right side thereof in FIGS. 4 and 5, and the upper side thereof in FIG. 6) is referred to herein as the outside or ground-contacting side of the block.

Considering the connections between blocks 20, 22, 24 as shown in FIG. 3, blocks 20, 22 are hinged together by a pin, or hinge means, 62. Similarly, blocks 20, 24 are hinged together through a like pin 64. With reference to the hinge connection existing between blocks 20, 22, it can be seen that the lower ends of the links in block 22 (which correspond to links 40, 42) straddle the ends of beam 26. Pin 62 extends through the link ends, and through beam 26. The pin is locked in place through nut and bolt assemblies, such as that shown at 66 which act between the ears in the links, such as between ears 48, 50 in link 40. Opposite ends of pin 62 are sealed to the inside of beam 26 through seals, such as the one shown at 68, provided in the upper ends of links 40, 42. Lubrication for maintaining free pivotal movement of pin 62 in beam 26 is provided by grease which is injected through fitting 56 into the insides of the various parts making up beam 26.

As can be seen particularly in FIG. 3, the only connection which exists between a pair of adjacent blocks takes the form of a pin which interconnects a beam in one block and the outer ends of links in the adjacent block. In particular, it should be noted that there is no connection between adjacent blocks at the locations of what has been referred to herein as the road-wheel bearing means, such as arms 34, 36, and plate 54.

Considering now some of the important structural features which are offered by the block construction just-described, simplicity is contributed by the fact that straddling end connections only are required to interconnect adjacent blocks. This is to be distinguished from a number of known track-block constructions which require not only end connections but also central connections between blocks, as in the regions of the road-wheel bearing members. The unique cantilever construction provided for the road-wheel bearing means herein, solves the problems of avoiding central interconnections between adjacent blocks and the matter of transmitting adequately all road-wheel bearing forces. In particular, all such forces are carried to the associated links in a block solely through the associated beam.

Another feature of the proposed construction is that it lends itself handily to manufacture through fabrication from separate parts. This is believed to offer significant manufacturing cost advanges.

As was mentioned earlier, there is a reason why the inside diameter of tube 28 in block 20 is larger than those in tubes 30, 32. This larger diameter accommodates easy final aligned drilling of the bores in tubes 30, 32 to provide appropriate alignment to receive pin 62. In other words, final manufacturing drilling to achieve such alignment does not require boring through the entire length of beam 26.

Considering yet another important feature of the present invention, and referrin to FIG. 2, in solid outline, links 20, 22, 24 are shown in substantially co-planar alignment. These are the relative positions which one might expect, ideally, in these blocks, when they are traveling, beneath road-wheels 18, over substantially flat ground. However, and as is well known, there are many terrains where it is necessary that adjacent blocks be capable of substantial reverse-direction swinging with respect to one another to encounter both travel over a sprocket and idler, and a small ground obstruction, such as a tree trunk. In dashed lines, at 20A, 24A in FIG. 2, blocks 20, 24 are shown in an extreme condition of angulation relative to one another as if these blocks were encountering such a ground obstruction. Substantial angulation in the opposite direction is illustrated between the right end of block 24 in FIG. 2 (dashed lines) and the left end of the next-adjacent block which is connected to block 24. FIG. 2, thus, illustrates fairly extreme conditions of reverse-direction swinging which is permitted by the construction proposed by the invention.

While a preferred embodiment of the invention has been described and shown herein, it is appreciated that variations and modifications may be made without departing from the spirit of the invention.

It is claimed and desired to secure by Letters Patent:

1. A track block for a track-laying vehicle coupleable with other like blocks to form an endless track strand, said block comprising
   a straddled-connection portion in the form of a unitary beam extending transversely relative to the block's intended travel axis,
   a pair of straddling-connection link portions integral with and joined to opposite ends of said beam and extending therefrom in a common direction generally paralleling said travel axis, said link portions being adapted to receive and straddle such a beam in an adjacent block, and
   platform-like road-wheel bearing means integral with and joined only to said beam, and extending therefrom in a cantilevered fashion generally in the same direction as said link portions, said bearing means being adapted to transmit received road-wheel bearing forces directly to said link portions solely through said beam.

2. An endless track strand for a track-laying vehicle comprising:

first and second generally planar track blocks, with each block including a straddled-connection portion in the form of a unitary beam extending transversely relative to the block's intended travel axis, a pair of straddling-connection link portions integral with and joined to opposite ends of said beam and extending therefrom in a common direction generally paralleling said travel axis, with the link portions in one of the blocks straddling the opposite ends of the beam in the other block, and platform-like road-wheel bearing means in each block integral with and joined only to the beam in the block, and extending therefrom in a cantilevered fashion generally in the same direction as the link portions in the block, with each said bearing means being adapted to transmit received road-wheel bearing forces directly to its associated link portions solely through the associated beam; and hinge means pivotally interconnecting the link portions in said one block to the beam in said other block to permit swinging of the blocks relative to one another about an axis which is substantially normal to said travel axis, said hinged-together link portions and beam being constructed to permit free reverse-direction swinging of the two blocks relative to one another with respect to a condition of coplanarity of the blocks.

* * * * *